United States Patent
Abohammdan et al.

(10) Patent No.: US 10,793,050 B2
(45) Date of Patent: *Oct. 6, 2020

(54) CLASPING MECHANISM

(71) Applicant: Walmart Apollo, LLC, Bentonville, AR (US)

(72) Inventors: Tawfeek J. Abohammdan, Bentonville, AR (US); Timothy R. Hodges, Bentonville, AR (US); Erica N. Poe Smith, Bella Vista, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 89 days.

This patent is subject to a terminal disclaimer.

(21) Appl. No.: 16/028,276

(22) Filed: Jul. 5, 2018

(65) Prior Publication Data

US 2018/0312101 A1    Nov. 1, 2018

Related U.S. Application Data

(62) Division of application No. 15/642,423, filed on Jul. 6, 2017, now Pat. No. 10,040,389.

(Continued)

(51) Int. Cl.
*B60P 7/08* (2006.01)
*B65D 67/02* (2006.01)
(Continued)

(52) U.S. Cl.
CPC ............... *B60P 7/0807* (2013.01); *B60P 3/00* (2013.01); *B60P 7/0815* (2013.01); *B60R 7/08* (2013.01);
(Continued)

(58) Field of Classification Search
CPC ......... B60P 7/0807; B60P 7/0815; B60P 3/00; B60P 3/007; B62D 33/02; B62D 33/0207; B60R 7/08; B65D 67/02; B65D 90/0073
(Continued)

(56) References Cited

U.S. PATENT DOCUMENTS 1,360,412 A * 11/1920 Kirchner ................... B60P 7/13
                                                                 410/67
2,351,314 A    6/1944 Ario
(Continued)

FOREIGN PATENT DOCUMENTS

GB    2434828    8/2007
JP    5075794    11/2012

OTHER PUBLICATIONS

PCT; App. No. PCT/US2017/040842; International Search Report and Written Opinion dated Sep. 14, 2017.
(Continued)

*Primary Examiner* — Stephen T Gordon
(74) *Attorney, Agent, or Firm* — Fitch, Even, Tabin & Flannery LLP

(57) ABSTRACT

In some embodiments, apparatuses and methods are provided herein useful to individually secure carts, racks, and the like within delivery vehicles using a universal clasping mechanism. The clasping mechanism is configured to clamp shut on a portion of the carts to thereby restrain the carts during transportation. In some embodiments, locking the clasping mechanism can be achieved by pushing a portion of the mechanism to thereby pivot arms of the mechanism to clamp on a portion of the cart.

21 Claims, 6 Drawing Sheets

Related U.S. Application Data

(60) Provisional application No. 62/371,290, filed on Aug. 5, 2016, provisional application No. 62/359,770, filed on Jul. 8, 2016.

(51) Int. Cl.
  *B60P 3/00* (2006.01)
  *B65D 90/00* (2006.01)
  *B62D 33/02* (2006.01)
  *B60R 7/08* (2006.01)

(52) U.S. Cl.
  CPC ......... *B62D 33/02* (2013.01); *B62D 33/0207* (2013.01); *B65D 67/02* (2013.01); *B65D 90/0073* (2013.01)

(58) Field of Classification Search
  USPC ................. 410/66, 67, 7–8, 69, 77, 80, 2–4; 292/27, 337, 244; 248/500, 503
  See application file for complete search history.

(56) References Cited

U.S. PATENT DOCUMENTS

| | | | |
|---|---|---|---|
| 2,806,436 A | 9/1957 | Johnston | |
| 3,984,117 A * | 10/1976 | Bates | B60P 7/08 410/66 |
| 4,162,804 A | 7/1979 | Davies | |
| 4,498,699 A | 2/1985 | Davies | |
| 4,682,922 A | 7/1987 | Andre | |
| 4,923,346 A * | 5/1990 | Hager | B60P 3/077 410/19 |
| 5,562,374 A * | 10/1996 | Plamper | B61D 1/06 410/66 |
| 6,099,220 A | 8/2000 | Poth | |
| 6,120,224 A | 9/2000 | Powell | |
| 10,040,389 B2 * | 8/2018 | Abohammdan | B60P 7/0815 |
| 2004/0105733 A1 * | 6/2004 | Hewitt | B60P 7/08 410/66 |
| 2005/0019126 A1 | 1/2005 | Pingel | |
| 2009/0047089 A1 | 2/2009 | Flood | |

OTHER PUBLICATIONS

Safety Clamps Inc.; Structural Lifting Clamps; http://www.safetyclamps.com/structural-lifting-clamps/; Available at least as early as Jul. 11, 2016; pp. 1-3.

Shindigz; Shark Pincher; http://www.shindigz.com/party/shark-pincher/pgp/8web2878; Available at least as early as Jul. 11, 2016; pp. 1-12.

Thule; Thule Big Mouth Roof Mounted Bike Rack—Frame Clamp; https://web.archive.org/web/20160628083517/http://www.etrailer.com:80/Roof-Bike-Racks/Thule/TH599XTR.html; Available at least as early as Jul. 6, 2016; pp. 1-27.

U.S. Appl. No. 15/642,423; Notice of Allowance dated Apr. 6, 2018.

Woodworker's Hardware; Sugatsune Low Profile Non-Magnetic Touch Latch Black; https://www.wwhardware.com/sugatsune-low-profile-non-magnetic-touch-latch-black-sumc28-blk; Available at least as early as Jul. 7, 2016; pp. 1.

\* cited by examiner

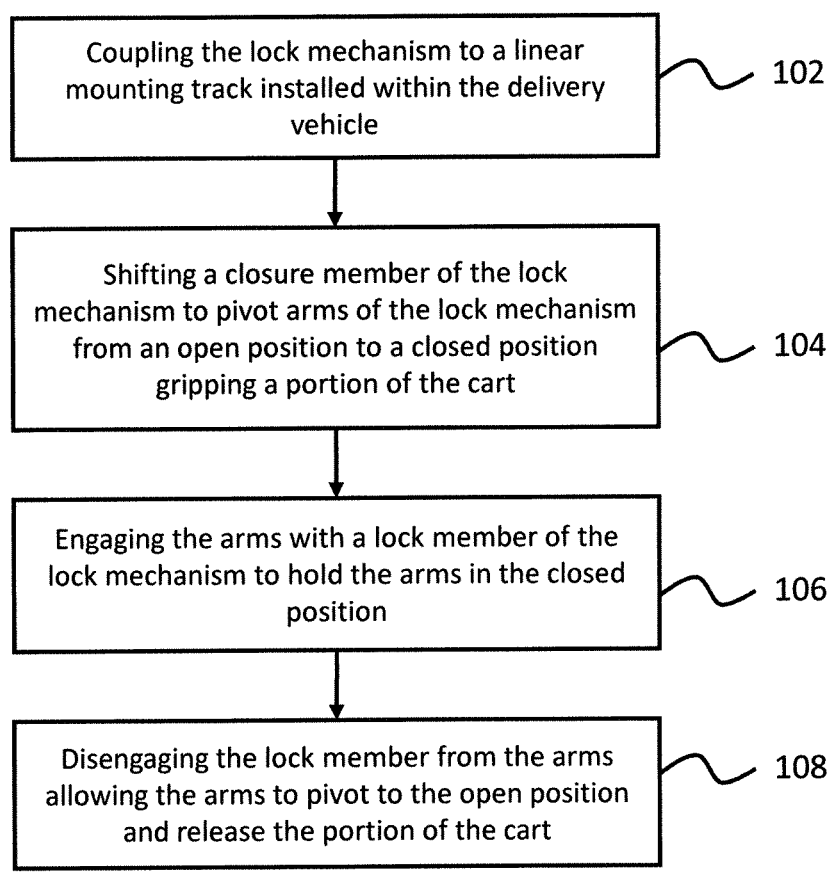

US 10,793,050 B2

CLASPING MECHANISM

CROSS-REFERENCE TO RELATED APPLICATIONS

This application is a divisional of U.S. application Ser. No. 15/642,423, filed Jul. 6, 2017, which claims the benefit of U.S. 62/359,770, filed Jul. 8, 2016, and U.S. 62/371,290, filed Aug. 5, 2016. All of these applications are incorporated in their entirety herein by reference.

TECHNICAL FIELD

This invention relates generally to a clasping mechanism and, more specifically, a clasping mechanism for linear tracking inside vehicles.

BACKGROUND

Linear tracking is commonly used inside of delivery vehicles to mount various devices for restraining cargo during transportation. One method is to use straps with hooks inserted into the linear tracking that can be tightened to restrain the cargo. This method can be time consuming if the cargo needs to be accessed individually. For example, restraining each piece of cargo individually can be time consuming and can require a lot of equipment. Using one strap on a plurality of pieces, while requiring less equipment, can require a user to unstrap unneeded cargo to access the desired cargo. This can lead to wasted time having to resecure the unneeded cargo. Another method is to use clamping locks that can be mounted to the linear tracking. The available clamping locks, however, are designed for specific containers or carts and, thus, have limited utility.

BRIEF DESCRIPTION OF THE DRAWINGS

Disclosed herein are embodiments of systems, apparatuses and methods pertaining restraining carts, racks, and the like using a universal clasping mechanism that is configured to mount to linear tracking within delivery vehicles. This description includes drawings, wherein:

FIG. 6 is a flowchart in accordance with several embodiments.

Figure 1:
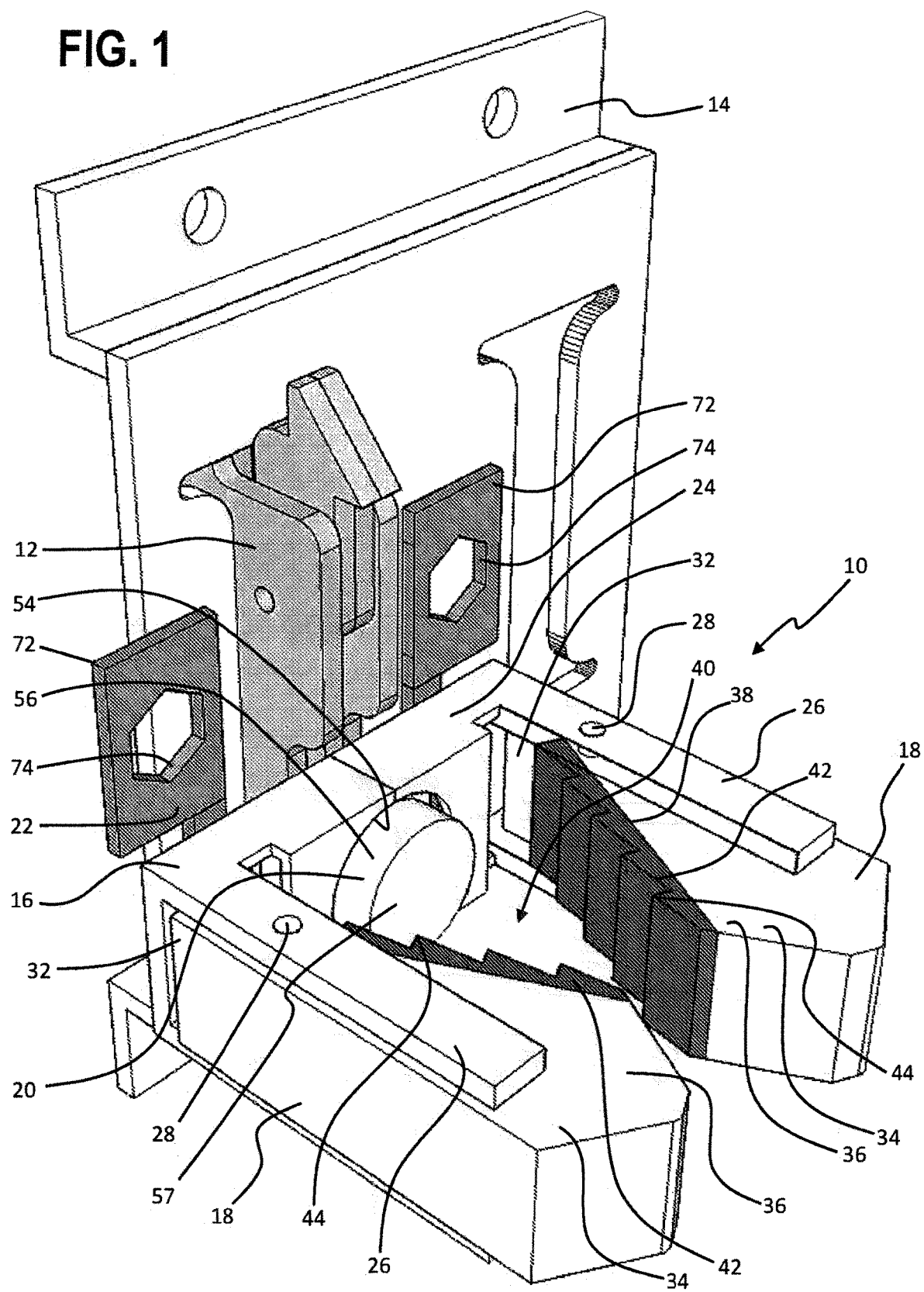
FIG. 1 is a perspective view of a clasping mechanism for linear tracking within a delivery vehicle showing arms thereof in a closed configuration in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to individually secure carts within delivery vehicles using a universal clasping mechanism. The clasping mechanism is configured to clamp shut on a portion of the carts to thereby restrain the carts during transportation. The clasping mechanism includes a locking area that can accommodate cross-sections of various shapes and sizes, thus increasing the utility of the device. Further, the clasping mechanism advantageously individually restrains the carts, so carts can be individually unsecured during a delivery route as needed, saving time versus having to unsecure and resecure unneeded carts. In some embodiments, locking the clasping mechanism can be achieved by pushing a portion of the mechanism to thereby pivot arms of the mechanism to clamp on a portion of the cart. For example, an upright portion of the cart can be laterally shifted into the clasping mechanism to thereby lock the cart in place. By a further approach, pushing the portion of the mechanism can be achieved by inserting the portion of the cart into the clasping mechanism, such that the clasping mechanism will automatically clamp on the portion of the cart.

A clasping mechanism 10 configured to couple to a portion, such as a leg, post, and so forth, of a cart 11 in accordance with the various embodiments described herein is shown in FIGS. 1-5. Cart, as it is used herein, can refer to any conveyance mechanism utilized for delivery, including racks, shelving, dollies, and so forth. The clasping mechanism 10 includes a coupling mechanism 12 configured to releasably couple to linear tracking 14 within a delivery vehicle using known components. The clasping mechanism 10 further includes a bracket or housing 16 coupled or mounted to the coupling mechanism 12. Arms 18 pivotably couple to the bracket 16 and are pivotable between open and closed positions. To pivot the arms 18, the clasping mechanism 10 includes a closure member 20 that is configured to be shifted, the movement of which pivots the arms 18 so that the arms 18 can pivot and collapse onto the cart 11. By one approach, the closure member 20 is shifted linearly towards the linear tracking 14 to drive rotation of the arms 18. By a further approach, the closure member 20 is horizontally aligned with the arms 18. A lock member 22 is configured to releasably hold the arms 18 in the closed position. The lock member 22 is further configured to be shifted to release the arms 18 to pivot to the open position.

Figure 2:
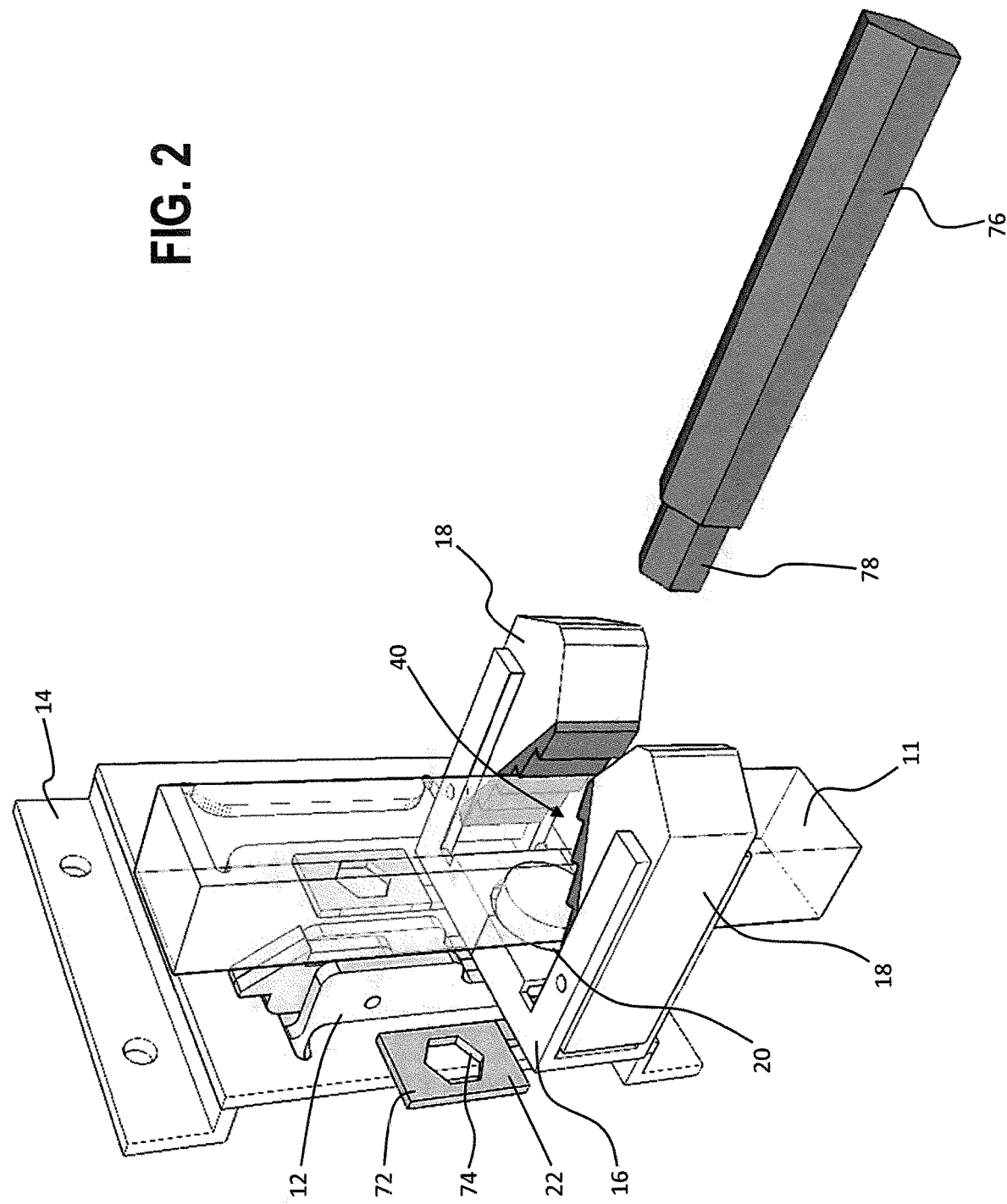
FIG. 2 is a perspective view of the clasping mechanism of FIG. 1 showing a rectangular portion of a cart secured within the clasping mechanism in accordance with several embodiments.
Figure 3:
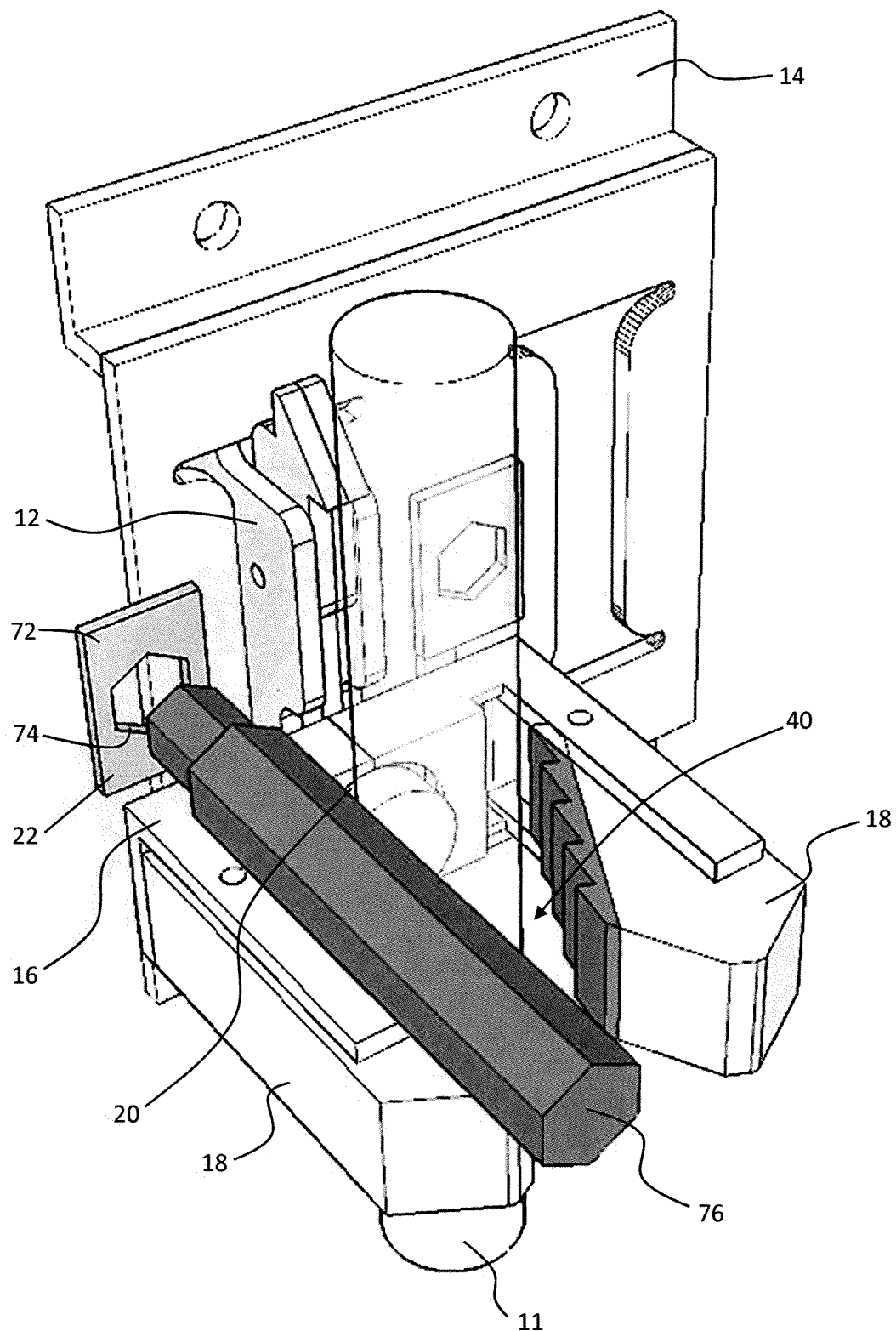
FIG. 3 is a perspective view of the clasping mechanism of FIG. 1 showing a cylindrical portion of a cart secured within the clasping mechanism in accordance with some embodiments.
Figure 4:
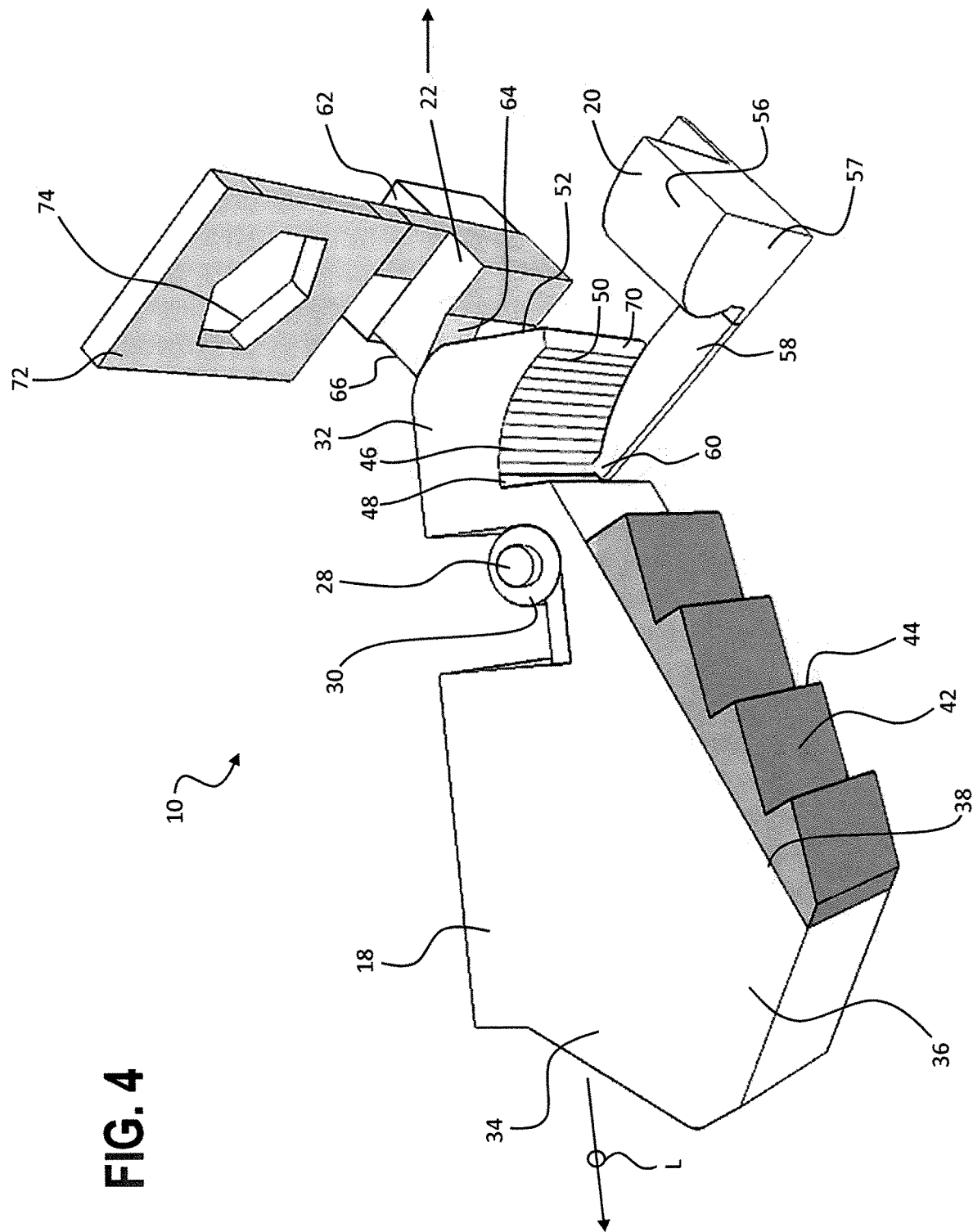
FIG. 4 is a sectional view of the clasping mechanism of FIG. 1 showing an arm thereof in an open configuration in accordance with several embodiments.

Details of the various components of the clasping mechanism 10 will now be described with reference to FIGS. 1-5. The bracket 16 includes a central portion 24 and laterally outward upstanding portions 26, which can be two pairs of upstanding posts as shown, disposed laterally outwardly of the central portion 24. The arms 18 are pivotably coupled to the upstanding portions 26 by hinges or pivots 28. So configured, the arms 18 can pivot between open positions, as shown in FIG. 4, to closed positions, as shown in FIGS. 1-3 and 5. In order to ease removing the portion of the cart 11 from between the arms 18, the hinges 28 can include spring mechanisms 30 to bias the arms 18 towards the open position. So configured, unless the arms 18 are held in the closed position by the lock member 22, the arms 18 will be forced open by the spring mechanisms 30.

In the illustrated form, the arms 18 project outwardly from the coupling mechanism 12 so that the arms are generally perpendicular to the linear tracking 14. As such, the portion of the cart 11, which extends in a direction generally perpendicular to a plane of the arms 18, can be inserted into the clasping mechanism 10 through an open area between the arms 18 towards the closure member 20, coupling mechanism 12, and linear tracking 14 to thereby engage the closure member 20. This configuration advantageously allows the cart 11 to be rolled or slid into the clasping mechanism 10 without having to lift the cart. The cart 11 is spaced from the arms 18 until the closure member 20 is engaged thereby to pivot the arms 18 into engagement with the cart 11.

The arms 18 include first and second portions 32, 34 separated by the hinge 28 mounted thereto. As shown, the second portions 34 are used to grip the cart 11 during use, while the first portions 32 are used to pivot the arms 18. By some approaches, the first portions 32 can be smaller than the second portions 34, such that the second portions 34 pivot a greater distance than the first portions 32. In order to accommodate carts 11 of various shapes and sizes, each second portion 34 can include an inwardly projecting portion 36 and an inwardly facing surface 38 that tapers outwardly between the inwardly projecting portion 36 and the hinge 28. In the illustrated form, the inwardly facing surfaces 38 are generally planar. So configured, the inwardly projecting portions 36 of the arms 18 are disposed close together, e.g., between 0 and about 2 inches, and more preferably between about 0.25 inches and about 1 inch, when the arms 18 are in the closed position and the inwardly facing surfaces 38 define a locking area 40 therebetween. In the illustrated form, the locking area 40 is generally triangular and pivoting of the angled inwardly facing surfaces 38 to the portion of the cart 11 ensure contact therewith. As such, the portion of the cart 11 can be laterally shifted into the locking area past the inwardly projecting portions 36 of the arms 18 and secured within the locking area 40 with the inwardly projecting portions 36 of the arms 18 preventing the portion of the cart 11 from coming free. Further, because of the configuration of the inwardly projecting portions 36 and the second portion inwardly facing surfaces 38, the clasping mechanism 10 can be used on a variety of carts, with a variety of structures, such as square as shown in FIG. 2 and circular as shown in FIG. 3. Advantageously, the clasping mechanism 10 does not rely on the weight or structure of the cart 11, other than the portion thereof sized to fit between the arms 18 such that the arms 18 can be locked in the closed position, to reliably secure the cart 11 to the linear tracking 14.

If desired, the inwardly facing surfaces 38 can include a gripping surface or material 42 disposed or applied thereon, such as rubber or the like, to grip the cart 11 and minimize damage to the cart 11. The gripping material 42 can be deformable to grip the cart 11 and restrict movement of the cart 11 without damaging the surface thereof. The gripping material 42 can further include ridges or steps 44 extending thereacross to further enhance the grip of the arms 18 for restraining the cart 11 during use. The ridges 44 can be generally large, such as 2-8 or 4-6 along the inwardly facing surfaces 38 so that the arms 18 can be used on a variety of cross-sections. As shown, the ridges 44 extend generally perpendicular to a plane of the arms 18 and in the same direction as the portion of the cart 11 so that one or more of the ridges 44 can engage the cart 11 during locking.

Figure 5:
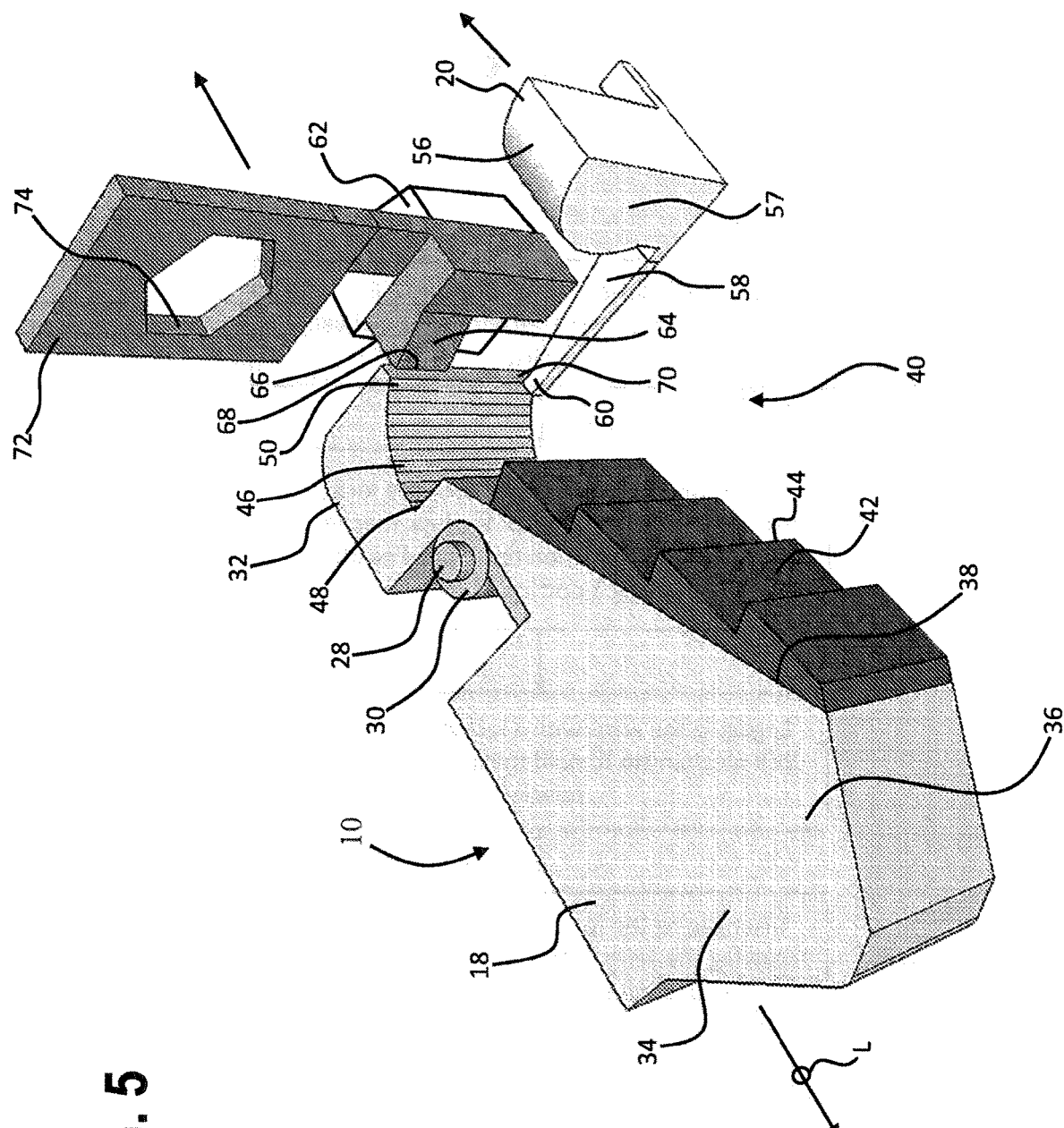
FIG. 5 is a sectional view of the clasping mechanism of FIG. 1 showing an arm thereof in a closed configuration in accordance with some embodiments.

As shown in FIGS. 5 and 6, the first portion 32 of each arm 18 includes a curved, inwardly facing surface 46. The curved surface 46 of each arm 18 is concave with a first end 48 adjacent to the hinge 28 and a second end 50 adjacent to an end surface 52 of the arm first portion 32. More specifically, the curved surface 46 at the first end 48 thereof is generally parallel with a longitudinal axis L of the arm 18 and extends concavely such that the curved surface 46 at the second end 50 thereof is transverse or angled with respect to the longitudinal axis L.

As discussed above, the closure member 20 is configured to be shifted to drive pivoting of the arms 18. Pursuant to this, the closure member 20 includes an engagement portion 56 which can be accessible at any portion of the clasping mechanism 10 as desired. In the illustrated form, as shown in FIG. 1, the central portion 24 of the bracket 16 includes an opening 54 extending therethrough. Advantageously, the closure member engagement portion 56 can be a button that extends through the opening 54 in the bracket 16 such that an end surface 57 thereof is disposed in the locking area 40. With this positioning, a user can easily engage the button 56 with the cart 11 during use.

To pivot the arms 18 to the closed position, the closure member 20 further includes lateral portions 58 that project outwardly from the button 56 to distal ends 60 thereof. So configured, when the cart 11 engages the button 56, the closure member 20 and the lateral portions 58 thereof is shifted rearwardly with respect to the bracket 16. As shown in FIGS. 5 and 6, the distal ends 60 of the lateral portions 58 engage and travel along the curved surfaces 46 of the arms 18. In the open position, the distal ends 60 are disposed at the first end 48 of the curved surface 46. As the closure member 20 is shifted rearwardly, however, the distal ends 60 of the closure member 20 are driven along the curved surfaces 46, forcing the arms 18 to pivot towards the closed position. So configured, engaging the button 56 with the cart 11 and shifting the closure member 20 rearwardly causes the arms 18 to pivot to the closed position and the inwardly projecting portions 36 thereof close around the cart 11 to secure the cart 11 within the locking area 40. If the arms 18 are biased by the spring mechanism 30 as discussed above, shifting of the closure member 20 can overcome the force of the springs to pivot the arms 18.

As set forth above, the clasping mechanism 10 utilizes the lock member 22 to hold the arms 18 in the closed position. More specifically, the lock member 22 is disposed adjacent to the first portion 32 of the arms 18 on an opposite side of the hinge 28. Additionally, due to the engagement of the closure member 20 with the cart 11, the cart 11 holds the closure member 20 in the shifted position while the clasping mechanism 10 in the locked configuration. A spring mechanism 62 can bias the lock member 22 forwardly towards the end surface 52 of the arm first portion 32 such that a forward surface 64 thereof engages the first portion end surface 52 when the arms 18 are in the open position. The lock member 22 further includes an outwardly facing, stop surface 66 generally transverse and adjacent to the forward surface 64 along an edge 68 thereof. The lock member 22 is sized so that pivoting of the arms 18 pivots the end surface 52 thereof past the lock member edge 68 and the spring mechanism 62 forces the lock member 22 forwardly, such that the stop surface 66 thereof engages an interior surface 70 of the arm first portion 32. The stop surface 66 effectively holds the arms 18 in the closed position and prevents the arms 18 from pivoting back to the open position.

Accordingly, when release is desired, a user can shift the lock member 22 rearwardly causing the stop surface 66 thereof to disengage from the arm interior surface 70, freeing the arms 18 to pivot back to the open position. The spring mechanisms 30 of the arms 18 can force the arms 18 to pivot to the open position, which also shifts the closure member 20 forwardly as the distal ends 60 of the lateral portions 58 are driven along curved surfaces 46 thereof. In order to ease the release, the lock member 22 can include one or more engagement or release portions 72 that extend to a position spaced laterally outwardly of the arms 18 so as to be more easily accessible. To further ease release, the engagement portions 72 can include a tool opening or recess 74 therein sized and configured to receive a tool 76 securely therein. In the illustrated form, the opening 74 is a hexagon and a tip 78 of the tool 76 is configured to fit within the hexagon opening 74. Of course, other shapes can also be utilized. So configured, a user can use the elongate tool 76 to release the clasping mechanism 10, which can be in difficult to reach areas blocked by carts 11 and other cargo. In the illustrated form, the lock member 22 includes two spaced engagement portions 72 on lateral sides of the coupling mechanism 12.

In some embodiments, a lock apparatus for a cart configured to couple to a linear mounting track installed within a delivery vehicle is described herein that includes a coupling mechanism configured to couple to the linear mounting track; a bracket secured to the coupling mechanism; arms pivotably coupled to the bracket and configured to be pivoted between open and closed positions; a closure member configured to be shifted to pivot the arms to the closed position gripping a portion of the cart; and a lock member having an arm engagement portion configured to engage and hold the arms in the closed position, the lock member configured to be shifted away from the arms to disengage the arm engagement portion thereof and release the arms to be pivoted to the open position.

By several approaches, the closure member can include a button portion having a distal end disposed between the arms, where the distal end is configured to be engaged by the portion of the cart to shift the closure member.

By some approaches, the arms can include inwardly facing curved surfaces; and the closure member can include laterally projecting outward portions that are configured to engage and slide down the inwardly facing curved surfaces of the arms when the closure member is shifted to pivot the arms to the closed position.

By several approaches, the lock member can include a release portion having an opening therein configured to receive a tool for shifting of the lock member away from the arms.

In several embodiments and as shown in FIG. 6, a method 100 for securing a cart within a delivery vehicle with a lock mechanism is described herein that includes coupling 102 the lock mechanism to a linear mounting track installed within the delivery vehicle; shifting a closure member of the lock mechanism to pivot arms of the lock mechanism from an open position to a closed position gripping a portion of the cart; engaging the arms with a lock member of the lock mechanism to hold the arms in the closed position.

By some approaches, shifting the closure member can include engaging a button portion of the closure member disposed between the arms with the portion of the cart.

By several approaches, shifting the closure member to pivot the arms can include engaging inwardly facing curved surfaces of the arms with laterally projecting outward portions of the closure member; and shifting the closure member to slide the laterally projecting outward portions thereof along the inwardly facing curved surfaces of the arms to thereby pivot the arms to the closed position.

By some approaches, the method can further include disengaging the lock member from the arms allowing the arms to pivot to the open position and release the portion of the cart. By further approaches, disengaging the lock member can include shifting the lock member away from the arms. By yet further approaches, shifting the lock member away from the arms can include inserting a tool into an opening of the lock member to shift the lock member away from the arms.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A method for securing a cart within a delivery vehicle with a lock mechanism, the method comprising:
   coupling the lock mechanism to a linear mounting track installed within the delivery vehicle;
   shifting a closure member of the lock mechanism to pivot arms of the lock mechanism from an open position to a closed position, thereby gripping a portion of the cart;
   engaging the arms with a lock member of the lock mechanism to hold the arms in the closed position; and
   biasing the arms towards the open position with a spring mechanism.

2. The method of claim 1, wherein gripping the portion of the cart comprises gripping the portion of the cart with gripping surfaces of the arms, the gripping surfaces having ridges extending thereacross.

3. The method of claim 1, wherein the shifting of the closure member comprises engaging a button portion of the closure member with the portion of the cart, the button portion laterally disposed between the arms of the lock mechanism.

4. The method of claim 1, wherein shifting the closure member to pivot the arms comprises:
   engaging inwardly facing curved surfaces of the arms with laterally projecting outward portions of the closure member; and
   shifting the closure member to slide the laterally projecting outward portions thereof along the inwardly facing curved surfaces of the arms to thereby pivot the arms to the closed position.

5. The method of claim 1, wherein engaging the arms with the lock member further comprises biasing the lock member towards the arms with a spring device.

6. The method of claim 1, further comprising disengaging the lock member from the arms allowing the arms to pivot to the open position and release the portion of the cart.

7. The method of claim 6, wherein disengaging the lock member comprises shifting the lock member away from the arms.

8. The method of claim 7, wherein shifting the lock member away from the arms comprises inserting a tool into an opening of the lock member to shift the lock member away from the arms.

9. The method of claim 1, wherein, in pivoting the arms of the lock mechanism from the open position to the closed position during the shifting of the closure member, causes generally planar inwardly facing surfaces of the arms to engage the portion of the cart and inwardly projecting portions of the arms to retain the portion of the cart in a locking area, wherein the locking area is partially defined by the inwardly facing surfaces.

10. A method for securing a cart within a delivery vehicle with a lock mechanism, the method comprising:
  coupling the lock mechanism to a linear mounting track installed within the delivery vehicle;
  shifting a closure member of the lock mechanism to pivot arms of the lock mechanism from an open position to a closed position, thereby gripping a portion of the cart with gripping surfaces of the arms, wherein the gripping surfaces have ridges extending thereacross; and
  engaging the arms with a lock member of the lock mechanism to hold the arms in the closed position.

11. The method of claim 10, wherein the shifting of the closure member comprises engaging a button portion of the closure member with the portion of the cart, the button portion laterally disposed between the arms of the lock mechanism.

12. The method of claim 10, further comprising disengaging the lock member from the arms allowing the arms to pivot to the open position and release the portion of the cart.

13. The method of claim 12, wherein disengaging the lock member comprises shifting the lock member away from the arms.

14. The method of claim 10, wherein, in pivoting the arms of the lock mechanism from the open position to the closed position during the shifting of the closure member, causes generally planar inwardly facing surfaces of the arms to engage the portion of the cart and inwardly projecting portions of the arms to retain the portion of the cart in a locking area, wherein the locking area is partially defined by the inwardly facing surfaces.

15. A method for securing a cart within a delivery vehicle with a lock mechanism, the method comprising:
  coupling the lock mechanism to a linear mounting track installed within the delivery vehicle;
  shifting a closure member of the lock mechanism to pivot arms of the lock mechanism from an open position to a closed position, thereby gripping a portion of the cart; and
  engaging the arms with a lock member of the lock mechanism to hold the arms in the closed position; and
  disengaging the lock member from the arms allowing the arms to pivot to the open position and release the portion of the cart, wherein the disengaging the lock member comprises shifting the lock member away from the arms, and wherein shifting the lock member away from the arms comprises inserting a tool into an opening of the lock member to shift the lock member away from the arms.

16. The method of claim 15, wherein the shifting of the closure member comprises engaging a button portion of the closure member with the portion of the cart, the button portion laterally disposed between the arms of the lock mechanism.

17. The method of claim 15, wherein, in pivoting the arms of the lock mechanism from the open position to the closed position during the shifting of the closure member, causes generally planar inwardly facing surfaces of the arms to engage the portion of the cart and inwardly projecting portions of the arms to retain the portion of the cart in a locking area, wherein the locking area is partially defined by the inwardly facing surfaces.

18. A method for securing a cart within a delivery vehicle with a lock mechanism, the method comprising:
  coupling the lock mechanism to a linear mounting track installed within the delivery vehicle;
  shifting a closure member of the lock mechanism to pivot arms of the lock mechanism from an open position to a closed position, thereby gripping a portion of the cart, wherein the shifting of the closure member to pivot the arms comprises: engaging inwardly facing curved surfaces of the arms with laterally projecting outward portions of the closure member; and
  shifting the closure member to slide the laterally projecting outward portions thereof along the inwardly facing curved surfaces of the arms to thereby pivot the arms to the closed position; and
  engaging the arms with a lock member of the lock mechanism to hold the arms in the closed position.

19. The method of claim 18, wherein the shifting of the closure member comprises engaging a button portion of the closure member with the portion of the cart, the button portion laterally disposed between the arms of the lock mechanism.

20. The method of claim 18, further comprising disengaging the lock member from the arms allowing the arms to pivot to the open position and release the portion of the cart.

21. The method of claim 20, wherein disengaging the lock member comprises shifting the lock member away from the arms.

* * * * *